Patented Mar. 12, 1940

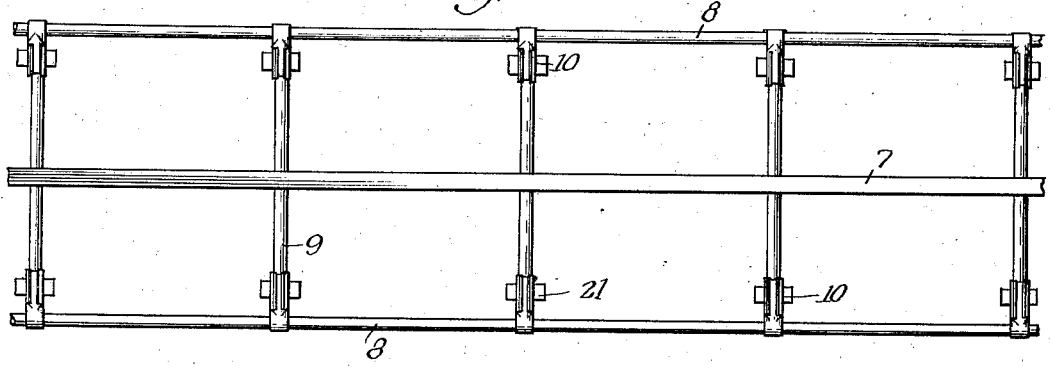
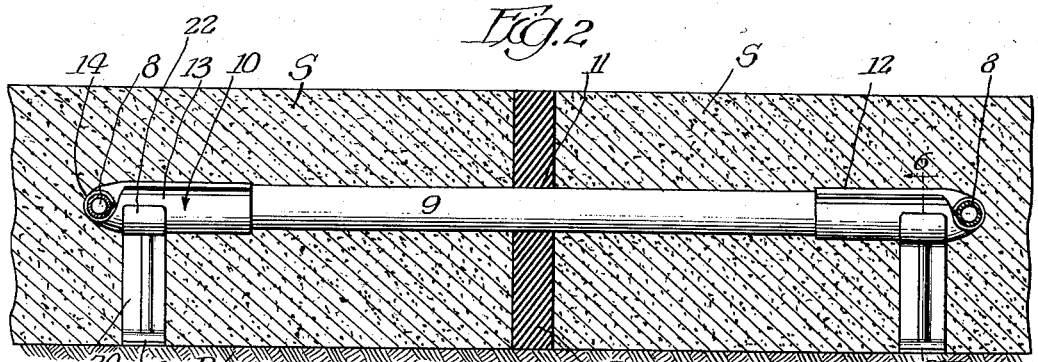
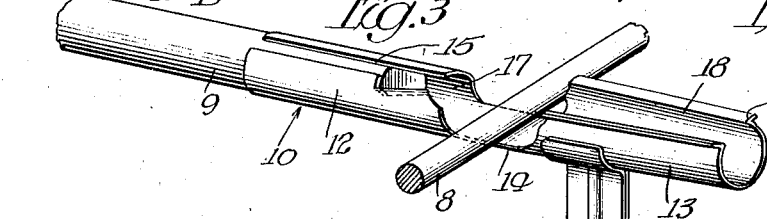
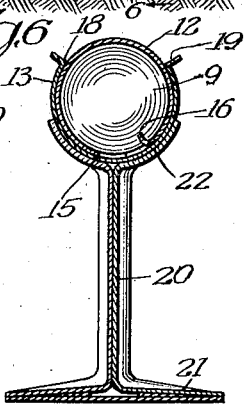
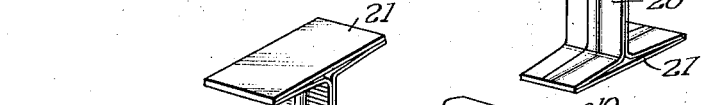

2,193,129

UNITED STATES PATENT OFFICE 2,193,129

JOINT FOR CONCRETE SLABS

Ernest H. Geyer and Marion R. Geyer, Chicago, Ill.

Application October 13, 1938, Serial No. 234,760

9 Claims. (Cl. 94—8)

The present invention relates generally to joints. More particularly the invention relates to that type of joint which is adapted for use between a pair of adjoining slabs in a roadway or like concrete structure, operates as a load transfer unit, and comprises (1) a pair of laterally spaced load distributing bars which are adapted for association respectively with the adjoining portions of the slabs and to extend transversely through the slabs; (2) a plurality of dowel rods which extend between and at right angles to the load distributing bars and are adapted to extend through the adjoining or opposed faces of the slabs; and (3) a group or set of comparatively short sleeves which encircle and are slidably mounted on the ends of the dowel rods, serve to secure the load distributing bars in attached or associated relation with the dowel rods and are adapted to become bonded to the slabs upon hardening of the concrete.

One object of the invention is to provide a slab joint of this type which is an improvement upon previously designed joints by reason of the fact that the sleeves are designed for quick and ready attachment to the load distributing bars and thus facilitate and expedite assembly of the joint at the place of installation or use.

Another object of the invention is to provide a joint of the type under consideration in which the sleeves for securing the load distributing bars in attached or associated relation with the dowel rods comprise (1) inner sleeve members which are designed to encircle and engage directly the outer ends of the dowel rod; (2) longitudinally slit outer sleeve members which are positioned in alignment with the inner sleeve members prior to assembly of the joint and are adapted in connection with joint assembly to be swung around or in encircling relation with the inner sleeve members; and (3) reduced strap-like intermediate parts which extend between and serve to connect the inner and outer sleeve members and are adapted in connection with joint assembly to receive the load distributing bars and to be bent into loop form around the bars in connection with swinging of the outer sleeve members around and in encircling relation with the inner sleeve members.

Another object of the invention is to provide a slab joint of the last mentioned character in which the reduced strap-like intermediate parts between the inner and outer members when in their looped position engage in a seal-like manner the load distributing bars and thus prevent concrete from entering the outer ends of the inner sleeve members during pouring of the slabs.

A further object of the invention is to provide a slab joint of the type and character under consideration in which the inner sleeve members are longitudinally slit and the outer sleeve members are substantially three-quarters round and when in encircling relation with the inner sleeve members contract the latter around the ends of the dowel rods.

A still further object of the invention is to provide a slab joint which is of new and improved construction and may be manufactured at a low and reasonable cost and in which the outer sleeve members are provided with roadbed engaging legs for holding the dowel rods in parallel relation and against tilting and are also provided with outwardly extending longitudinal flanges along the slit defining margins thereof whereby placement or manipulation of the outer sleeve members into encircling relation with the inner sleeve members is facilitated.

Other objects of the invention and the various advantages and characteristics of the present slab joint will be apparent from a consideration of the following detailed description.

The invention consists in the several novel features which are hereinafter set forth and are more particularly defined by claims at the conclusion hereof.

In the drawing which accompanies and forms a part of this specification or disclosure and in which like numerals of reference denote corresponding parts throughout the several views:

Figure 1 is a plan view of a joint embodying the invention;

Figure 2 is an enlarged transverse sectional view showing the joint in its operative position with respect to a pair of concrete slabs;

Figure 3 is a perspective view showing one of the sleeves prior to bending of the outer sleeve member into encircling relation with the inner sleeve member;

Figure 4 is a perspective view showing the sleeve of Figure 3 after bending of the outer sleeve member around the inner sleeve member;

Figure 5 is a perspective view showing the sleeve of Figures 3 and 4 after it has been turned over in order to bring the leg thereof into its proper or operative position; and Figure 6 is a vertical sectional view on the line 6—6 of Figure 2.

The joint which is shown in the drawing constitutes the preferred embodiment of the invention and is illustrated in connection with a pair of concrete roadway forming slabs S. The latter, as shown in Figure 2, are spaced slightly apart and rest on a bed B. The joint operates as a load transfer unit and at the same time permits the slabs S to expand or contract as the result of temperature changes. It is adapted to be assembled immediately prior to pouring of the slabs S, as hereinafter described, and comprises a filler strip 7, a pair of laterally spaced horizontally extending load distributing bars 8, a plurality of dowel rods 9 between the two bars 8, and a group or set of sleeves 10.

The filler strip 7, the load distributing bars 8, and the dowel rods 9 are of conventional or standard design. The filler strip is formed of felt, treated sponge rubber, or any other suitable elastic or compressible material. It is vertically positioned between the adjoining or opposed faces of the concrete slabs S and serves to prevent dirt, water, or like material, from passing between the slabs. When the slabs expand as the result of an increase in temperature, the filler strip 7 is compressed between the two slabs and when the slabs contract as the result of a decrease or drop in temperature the strip, due to its elastic nature, expands and thus effectively fills at all times the gap or void between the two slabs. The load distributing bars 8 are in the form of solid metallic rods and are associated with the slabs S respectively. They are disposed in parallel relation and extend transversely through the slabs, as shown in Figure 2. Preferably the bars 8 are disposed midway between the top and bottom faces of the slabs and the ends of the bars terminate at the side faces of the slabs. The dowel rods 9 extend between, and at right angles to, the load distributing bars and serve as the load transfer members of the joint. They are preferably formed of solid steel and are coated with graphite or any other suitable lubricant prior to pouring of the concrete in order to prevent them from becoming bonded to the slabs after hardening of the latter. As the result of the graphite or other coatings the rods are free to slide relatively to the slabs and thus they do not interfere with expansion or contraction of the latter. The central portions of the dowel rods 9 extend across the adjoining or opposed faces of the slabs S and fit within holes 11 in the compressible filler strip 7.

The sleeves 10 are in the form of sheet metal stampings and serve to secure the load distributing bars 8 in attached or associated relation with the ends of the dowel rods. They are adapted to become bonded to the concrete after hardening of the latter and comprise inner sleeve members 12, outer sleeve members 13, and reduced strap-like intermediate parts 14 between the inner and outer members. The inner members embody longitudinally extending slits 15, and are shaped and adapted to surround the outer ends of the dowel rods 9, as shown in Figure 3. The slits 15 extend from the inner ends of the inner sleeve members 12 to the outer ends and permit the inner sleeve members to be contracted around the outer ends of the dowel rods. At their outer ends the inner sleeve members are slit circumferentially from the slits 15 and the severed portions are bent inwards to form stop lugs 16. The latter are adapted to engage the outer ends of the dowel rods and in connection with assembly of the sleeves 10 prevent the inner sleeve members from being slid all the way over the ends of the dowel rods. Because of the stop lugs 16 the outer ends of the inner sleeve members 12 project beyond the ends of the dowel rods when the inner members are slid into place in connection with installation or assembly of the joint and provide air spaces 17 into which the ends of the dowel rods may slide during contraction or expansion of the slabs S. Due to the fact that the stop lugs 16 are formed of sheet metal they fracture or break when the ends of the dowel rods slide into the air spaces 17 for the first time as the result of the expansion of the slabs S. When the joint is in its fully assembled position the outer ends of the air spaces 17 are closed by the load distributing bars 8 and the reduced strap-like intermediate parts 14 of the sleeves 10. By having the load distributing bars and said parts 14 serve as closures for the outer ends of the space 14 no concrete is permitted to flow into the spaces during pouring of the concrete in connection with the formation of the slabs S. The outer sleeve members 13 are positioned in longitudinal alignment with the inner sleeve members prior to assembly of the joint and embody longitudinally extending slits 18. These slits extend from the inner to the outer ends of the inner sleeve members. They are longitudinally aligned with the slits 15 in the inner sleeve members when the outer sleeve members are aligned with the inner sleeve members and are of such width that the outer sleeve members are substantially three-quarters round. The outer sleeve members are adapted in connection with assembly of the joint to be swung inwardly against the inner sleeve members 12 and to be forced or pressed into encircling relation with the inner sleeve members, as shown in Figures 4, 5 and 6. When the outer sleeve members are in their operative position they contract the inner sleeve members into gripping relation with the outer ends of the dowel rods and cover the slits 15 so that no concrete can enter the air spaces 17 via the slits. The margins of the outer sleeve members which define the longitudinal slits 18 are bent outwardly to form outwardly extending flanges 19. These flanges are adapted in connection with assembly of the joint to be brought into engagement with the sides of the inner sleeve members 12 and serve when the outer sleeve members are forced into encircling relation with the inner sleeve members to expand or spread apart the sides of the outer sleeve members and thus facilitate assembly of the joint as a whole. The reduced strap-like parts 14 serve to connect the inner and outer sleeve members 12 and 13 and are adapted to receive the load distributing bars 8. When the outer sleeve members 13 are swung into their operative position, that is, in encircling relation with the inner sleeve members, the intermediate parts 14 become bent into loop form, as shown in Figure 4, and thus secure the load distributing bars 8 against the outer ends of the inner sleeve members 12. The side edges of the parts 14 and the opposed end edges of the inner and outer sleeve members 12 and 13 are so shaped that when the parts 14 are in loop form around the load distributing bars, the bars are gripped circumferentially and hence seals are formed between the parts 14 and the rods and the outer ends of the air spaces 17 are closed against the entry of concrete. When the sleeves 10 are in their operative position the load distributing bars 8 are held in connected or associated relation with the dowel rods and operate to hold the dowel rods in true parallelism. As a result of the loop formations which are formed around the dowel rods when the outer sleeve members 13 are swung into place assembly of the joint as a whole is extremely simple.

In order to support the load distributing bars 8 and the dowel rods 9 in a horizontal plane during pouring of the concrete for the slabs S, the sleeves 10 are provided with sheet metal legs 20. These legs embody roadbed engaging laterally elongated feed 21 at the lower ends thereof and have semi-cylindrical saddles 22 at their upper ends. The saddles fit around and are welded to the outer sleeve members 13, as shown in Figure 6, and serve permanently to connect the legs 20 to the outer sleeve members.

The joint is assembled in the following manner: The dowel bars 9 are first slid through the holes 11 in the compressible filler strip 7. Thereafter the inner sleeve members 12 of the sleeves are slid onto the outer ends of the dowel rods. In mounting the inner members 12 on the dowel rods, they are slid inwards until the stop lugs 16 are brought into abutment with the ends of the dowel rods. The inner sleeve members are preferably mounted or assembled with respect to the outer ends of the dowel bars so that the slits 15 face upwards, as shown in Figure 3. After sliding the inner sleeve members 12 onto the outer ends of the dowel bars, the load distributing bars 8 are laid on the reduced strap-like intermediate parts 14, as shown in Figure 3. Thereafter the outer sleeve members 13 of the sleeves are swung upwardly and inwardly and then downwardly until the flanges 19 engage the upper side portions of the inner sleeve members 12. During this operation the intermediate parts 14 are bent around the contiguous portions of the load distributing bars and bring such portions into abutment with the outer ends of the inner sleeve members 12. As soon as the flanges 19 are brought into contact or engagement with the upper side portions of the inner sleeve members, the outer sleeve members 13 are forced downwards until they are in complete encircling relation with the inner sleeve members. During the last mentioned step or operation, the flanges slide on the contiguous side portions of the inner sleeve members and cause the sides of the outer sleeve members to spring outwards. As soon as the flanges pass the central portions of the sides of the inner sleeve members, the outer sleeve members snap around the inner sleeve members and contract the latter around the outer ends of the dowel rod. After the outer sleeve members are brought into encircling relation with the inner sleeve members, the joint as a whole is turned over so as to bring the legs 20 into a depending position. Thereafter the joint is placed across the roadbed B. When the joint is in place on the roadbed the legs, as heretofore pointed out, hold the dowel rods against tilting and maintain the rods and the load distributing bars in a horizontal plane. After placement of the joint on the roadbed concrete is poured on both sides of the filler strip 11 in order to form the slabs S. When the slabs expand as a result of high temperature conditions, the sleeves 10 slide inwardly on the outer ends of the dowel rods and the ends of the dowel rods rupture the stop lugs 16. Sliding movement of the sleeves relatively to the outer ends of the dowel rods is permitted as the result of the air spaces 10 in the outer ends of the inner sleeve members 17.

Due to the construction and design of the sleeves the joint may be manufactured at a low and reasonable cost and may be assembled readily and quickly.

Whereas the joint has been described as including a compressible filler strip 11, it is to be understood that the joint may be used without such a strip in connection with a contraction type joint or a plane of weakness joint. It is also to be understood that the invention is not to be restricted to the details set forth since these may be modified within the scope of the appended claims, without departing from the spirit and scope of the invention.

Having thus described the invention, what we claim as new and desire to secure by Letters Patent is:

1. In a joint for contiguous concrete slabs, the combination of a load distributing bar adapted for embedment in and to extend transversely across one of the slabs, a plurality of laterally spaced dowel rods extending at right angles to the bar and having the ends thereof at one side adapted for embedment in the one slab and the ends thereof at the other side adapted for embedment in the other slab, and sleeves for holding the bar in assembled relation with the ends of the dowel rods at said one side comprising inner sleeve members fitting around said ends of the dowel rods at said one side, outer sleeve members fitting around the inner members, and strap-like intermediate parts between and connecting the inner and outer members and looped around the contiguous portions of the bar.

2. In a joint for contiguous concrete slabs, the combination of a load distributing bar adapted for embedment in and to extend transversely across one of the slabs, a plurality of laterally spaced dowel rods extending at right angles to the bar and having the ends thereof at one side adapted for embedment in the one slab and the ends thereof at the other side adapted for embedment in the other slab, and sleeves for holding the bar in assembled relation with the ends of the dowel rods at said one side comprising longitudinally slit inner sleeve members fitting around and slidably mounted on said ends of the dowel rods at said one side, longitudinally slit outer members fitting around and serving to contract the inner members and positioned so as to cover the slits in the inner members, and strap-like intermediate parts between and connecting the inner and outer members and looped around the contiguous portions of the bar in such manner as to hold such portions against the inner and outer members.

3. In a joint for contiguous concrete slabs, the combination of a load distributing bar adapted for embedment in and to extend transversely across one of the slabs, a plurality of laterally spaced dowel rods extending at right angles to the bar and having the ends thereof at one side adapted for embedment in the one slab and the ends thereof at the other side adapted for embedment in the other slab, and sleeves for holding the bar in assembled relation with the ends of the dowel rods at said one side comprising inner sleeve members having the inner ends thereof fitting around and slidably mounted on said ends of the dowel rods at said one side and the outer ends forming air spaces for permitting sliding movement of said inner members relatively to the rods, outer sleeve members fitting around and coextensive with the inner members, and strap-like intermediate parts extending between and connecting the inner and outer members and looped around the contiguous portions of the bar in such manner as to hold such portions against and in air space closing relation with the outer ends of the inner and outer members.

4. In a joint for contiguous concrete slabs, the combination of a load distributing bar adapted for embedment in and to extend transversely across one of the slabs, a plurality of laterally spaced dowel rods extending at right angles to the bar and having the ends thereof at one side adapted for embedment in the one slab and the ends thereof at the other side adapted for embedment in the other slab, and sleeves for holding the bar in assembled relation with the ends of the dowel rods at said one side comprising inner sleeve members fitting around said ends of the dowel rods at said one side, outer sleeve members fitting around the inner members, strap-like intermediate parts between and connecting the inner and outer members and looped around the contiguous portions of the bar, and supporting legs connected to and depending from the outer members.

5. In a joint for contiguous concrete slabs, the combination of a pair of parallel load distributing bars adapted for embedment in and to extend transversely through the slabs respectively, a plurality of laterally spaced dowel rods extending between and at right angles to the bars and adapted to have the ends thereof extend into the slabs respectively, and sleeves for holding the bars in assembled relation with the rods comprising inner sleeve members fitting around the ends of the dowel rods, outer sleeve members fitting around the inner members, and strap-like intermediate parts between and connecting the inner and outer members and looped around the contiguous portions of the bars.

6. A sleeve for securing a load distributing bar in assembled relation with a dowel rod at right angles to the bar, comprising an inner sleeve member adapted to fit and slide on one end of the dowel rod, a strap-like bar receiving intermediate part and a longitudinally slit outer sleeve member adapted to be bent into encircling relation with the inner member and during bending thereof to cause the intermediate part to be moved around the bar.

7. A sleeve for holding a load distributing bar in assembled relation with a dowel rod at right angles to the bar, comprising a longitudinally slit inner sleeve member adapted to fit and slide on one end of the dowel rod, a reduced strap-like bar receiving intermediate part and a longitudinally slit outer sleeve member adapted to be bent into encircling relation with the inner member and during bending thereof to cause the intermediate part to be so looped around the bar as to hold the latter against the outer end of the inner member.

8. In a joint for contiguous concrete slabs, the combination of a load distributing bar adapted for embedment in and to extend transversely across one of the slabs, a plurality of laterally spaced dowel rods extending at right angles to the bar and having the ends thereof at one side adapted for embedment in the one slab and the ends thereof at the other side adapted for embedment in the other slab, and sleeves for holding the bar in assembled relation with the ends of the dowel rods at said one side comprising inner sleeve members fitting around said ends of the dowel rods at said one side, outer sleeve members fitting around the inner members, strap-like intermediate parts between and connecting the inner and outer members and looped around the contiguous portions of the bar, and supporting legs connected to and depending from certain of the members.

9. A sleeve for securing a load distributing bar in assembled relation with a dowel rod at right angles to the bar, comprising an inner sleeve member adapted to fit and slide on one end of the dowel bar, a strap-like bar receiving intermediate part and a longitudinally slit outer sleeve member adapted to be bent into encircling relation with the inner member and during bending thereof to cause the intermediate part to be moved around the bar, and a supporting leg connected to and depending from one of the sleeve members.

ERNEST H. GEYER.
MARION R. GEYER.